Feb. 10, 1970 TADAO KOHASHI 3,495,088
ENERGY-SENSITIVE LUMINOUS DISPLAY DEVICE
Filed Oct. 17, 1966 4 Sheets-Sheet 1

United States Patent Office 3,495,088
Patented Feb. 10, 1970

3,495,088
ENERGY-SENSITIVE LUMINOUS DISPLAY DEVICE
Tadao Kohashi, Yokohama, Japan, assignor to Matsushita Electric Industrial Co., Ltd., Osaka, Japan, a corporation of Japan
Filed Oct. 17, 1966, Ser. No. 587,228
Claims priority, application Japan, Oct. 25, 1965, 40/65,857
Int. Cl. H05b 41/00
U.S. Cl. 250—213                                    9 Claims

ABSTRACT OF THE DISCLOSURE

An energy sensitive luminescent display device comprising an energy sensitive element at least the resistance or capacitance of which varies depending on the intensity of input radiation and an electrically luminescent element the luminescence of which varies depending upon the intensity of an electric field applied thereto, at least one of said energy sensitive elements and said electrically luminescent element constituting an RC transmission circuit, said electric field applied to said electrically luminescent element being controlled by selecting the resonance frequency of said RC transmission circuit by controlling the circuit constant thereof.

---

This invention relates to energy-sensitive luminous display devices and more particularly to a luminescence device of the kind described which is based on a novel principle entirely different from the prior principle and which luminesces at a high sensitivity even with slight excitation by radiation.

Conventional energy-sensitive luminous display devices generally comprise the combination of an electroluminescent element and a sensitive element such as a photoconductive element whose impedance is variable in response to excitation by radiation and are so arranged that variation of impedance of the sensitive element causes variation of a voltage applied across the electroluminescent element for thereby deriving the luminescence corresponding to the degree of excitation by the radiation. However, due to the fact that there are certain inherent limitations in the impedance and the amount of impedance variation in the sensitive element used in the conventional energy-sensitive luminous display devices as described above, it has been difficult to effect a highly sensitive operation of these devices in response to excitation by radiation and it has heretofore been a great problem how to attain the desired highly sensitive operation.

It is therefore the primary object of the present invention to provide a luminous display device of structure entirely different from the prior structure for thereby attaining the desired high sensitivity which has been difficult to obtain with prior devices of this kind.

More precisely, the energy-sensitive luminous display device according to the invention comprises the combination of a sensitive element of the kind in which at least its resistance or capacitance is variable in response to excitation by radiation and an electroluminescent element, and is so constructed that the sensitive element and/or the electrically luminescent element constitute part of an active or passive RC transmission network and are connected to a source of AC voltage supply so that the voltage applied across the electrically luminescent element is varied in a manner to have a frequency selection function with relation to variation of impedance of the sensitive element due to excitation by radiation for thereby controlling the luminescence of the electrically luminescent element.

The above and other objects, advantages and features of the present invention will become apparent from the following description with reference to the accompanying drawings, in which.

Figure 1:
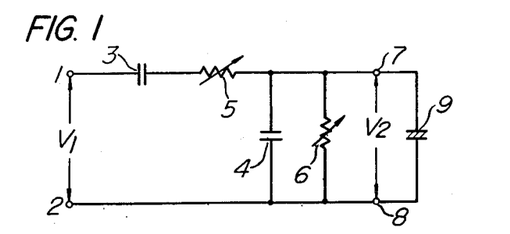
FIGS. 1, 3 and 5 are electrical equivalent circuit diagrams of a few preferred forms of the energy-sensitive luminous display device according to the present invention.
Figure 2:
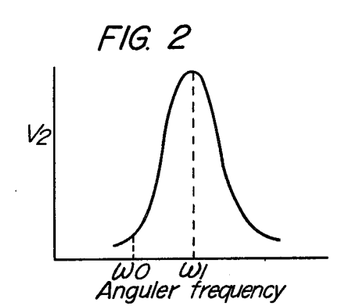
FIG. 2 is a graphic illustration of the manner of operation of the device of the present invention.

An embodiment of the invention schematically shown in FIG. 1 in the form of an equivalent circuit has such a structure that sensitive elements having a variable resistance are employed as part of an RC transmission network and an electrically luminescent element such as electroluminescent element is connected between the output terminals of the above-described transmission network. Referring to FIG. 1, an AC voltage at a voltage value $V_1$ and at an angular frequency $\omega_1$ is applied across input terminals 1 and 2. Photosensitive elements 3 and 4 such as photo diodes form capacitances $C_1$ and $C_2$, respectively. Sensitive elements 5 and 6 such as photoconductive elements have resistances which are variable in response to excitation by radiation and show, for example, respective resistances $R_{10}$ and $R_{20}$ when there is no radiant energy input $L_1$. Output voltage $V_2$ appearing at output terminals 7 and 8 of the RC transmission network is variable depending on variation in the power source frequency as shown in FIG. 2. Thus the RC transmission network has a frequency selection function.

Suppose, for example, that the RC transmission network defined between the input terminals 1, 2 and the output terminals 7, 8 has a resonance frequency $\omega_0$ at a zero radiant energy input. This resonance frequency $\omega_0$ can be expressed by $$\omega_0 = \frac{1}{\sqrt{C_1 C_2 R_{10} R_{20}}}$$

Suppose then that the resistances $R_{10}$ and $R_{20}$ of the respective sensitive elements 5 and 6 decrease to $R_1$ and $R_2$ by the appearance of a radiant energy input $L_1$. Then the resonance frequency of the RC transmission network is given by $$\frac{1}{\sqrt{C_1 C_2 R_1 R_2}}$$

which is higher than $\omega_0$. Therefore by arranging in a manner that this value equals the power source angular frequency $\omega_1$, voltage applied across an electroluminescent element 9 connected between the output terminals 7 and 8 becomes very high during the excitation by radiation, and a highly sensitive operation can be attained in spite of a slight variation of impedances of the sensitive elements for thereby obtaining a bright luminous output $L_2$. The radiant energy input $L_1$ may be applied to the photosensitive elements 3 and 4, in lieu of the sensitive elements 5 and 6, so as to vary the capacitances $C_1$ and $C_2$ thereof and to thereby vary the resonance frequency so as to likewise attain a highly sensitive operation. The device having the above operating characteristics can for example be used as a detecting device for a minute quantity of radiation.

Figure 3:
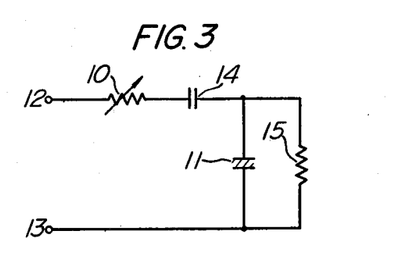
Figure 4:
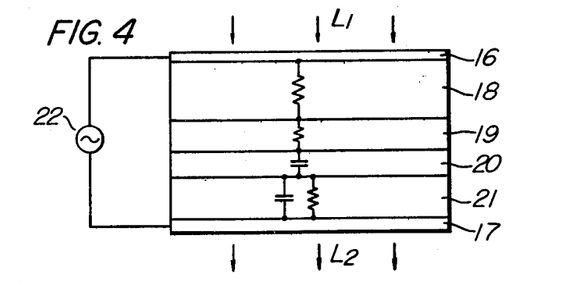
FIG. 4 is a schematic sectional view of the energy-sensitive luminous display device shown in FIG. 3, the device being shown together with a power supply system therefor.

Another embodiment of the invention shown by an electrical equivalent circuit in FIG. 3 has such a structure that a photoconductive element 10 having a variable resistance and an electroluminescent element 11 constitute part of an RC transmission network. The circuit of FIG. 3 further includes power input terminals 12 and 13, condenser 14 and a resistance 15. The actual structure of the device indicated by the equivalent circuit in FIG. 3 may for example be as shown in FIG. 4. The device of FIG. 4 includes transparent electrodes 16 and 17, a photoconductive layer 18, an opaque resistance layer 19 formed by bonding carbon particles with an epoxy resin, a dielectric layer 20, an electroluminescent layer 21 and a source of AC power supply 22. As will be apparent from the schematic illustration of resistance and capacitance distribution in FIG. 4, the device of FIG. 4 is represented by the equivalent circuit of FIG. 3. $L_1$ and $L_2$ in FIG. 4 designate a radiant energy input and an optical output, respectively.

As in the case of the embodiment shown in FIG. 1, this embodiment also operates in such a way that the resonance frequency of the transmission network varies in response to variation of the resistance of the photoconductive layer 10 and the voltage applied across the electroluminescent layer 11 is varied in a manner to have a frequency selection function for thereby controlling the luminescence thereof.

Figure 5:
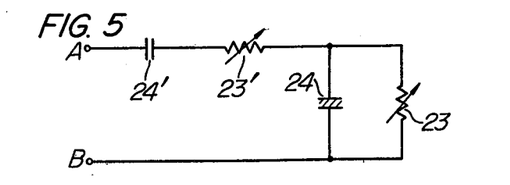

In a further embodiment shown by an equivalent circuit in FIG. 5, a sensitive element 23 such as a photoconductor is used as a resistor and connected in parallel with an electroluminescent element 24 in an RC transmission network. This circuit further includes power input terminals A and B, a resistance 23' and a condenser 24'. In this embodiment too, voltage applied across the electroluminescent element 24 varies in a frequency selection fashion and thus the desired purpose can be attained.

From the foregoing description it will be understood that, in the invention, voltage applied across an electroluminescent element is varied in a frequency selection fashion so as to control the luminescence of the electroluminescent element, and thus an optical output $L_2$ can be increased, decreased or varied in an inverted-V fashion with respect to a radiant energy input $L_2$ by suitable selection of the source frequency. The electroluminescent element can therefore operate at a high sensitivity in response to a slight variation of impedance of a sensitive element or elements. The device according to the invention can thus find wide applications including a detecting device for radiation.

A further embodiment of the present invention relates to an energy-sensitive luminous display device of frequency selective nature which is featured by the fact that an energy-sensitive resistance element whose resistance is variable depending on the intensity of input radiant energy covers a plurality of spaced electrically luminescent elements disposed in dots, lines, strips or like form so that the resistance element extends from one face of the electrically luminescent elements into the gaps between the electrically luminescent elements, and a capacitive dielectric element is disposed on that face of the energy-sensitive element which is remote from the electrically luminescent elements to form a composite stack, said composite stack being interposed between opposite electrodes.

Description will be given in detail hereunder with regard to a case in which a resistive photoconductor element, and an electroluminescent (EL) element are used as the energy-sensitive resistance element and the electrically luminescent element, respectively, and light is employed as the input radiant energy.

Figure 6:
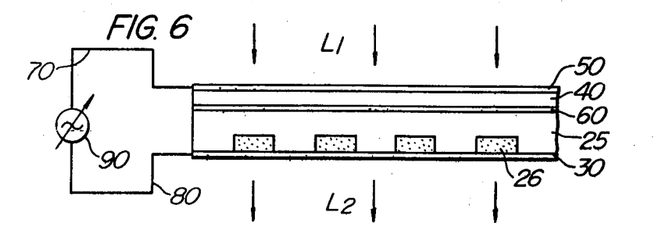
FIG. 6 is a vertical sectional view of another embodiment of the energy-sensitive luminous display device according to the present invention, the device being shown together with a power supply system therefor.

Referring to FIG. 6, reference numeral 25 designates a known resistive infrared-sensitive photoconductive element having a low dark specific resistance formed of a plate of silicon crystal activated by zinc, gold or the like. On one face of this element 25, linear or strip-like grooves are formed in equally spaced relation by means of any known method and are filled with a known EL material such as ZNS which is vacuum evaporated, sintered or mixed with a suitable binder such as a plastic binder material to form linear or strip-like EL elements 26 deposited in these grooves. A light-transmissive electrode 30 is provided by, for example, the vacuum deposition of a thin film of material such as gold. A filmy capacitive dielectric element 40 formed, for example, from a thin quartz or glass sheet is bonded to the plate form element 25 by a capacitive binder 60 such as a polyester resin. The other surface of the dielectric element 40 is covered by an electrode 50 formed of a thin film of a metal oxide such as stannic oxide. In this case, those elements including the electrode 50, dielectric element 40, binder 60 and plate form photoconductive element 25 forming the stack should all be transmissive of input radiant energy which is infrared rays $L_1$ in the present embodiment. The electrodes 30 and 50 are connected by way of leads 70 and 80 to a source of variable-frequency AC supply 90 from which a sine wave voltage $V(\omega)$ is supplied.

Figure 7:
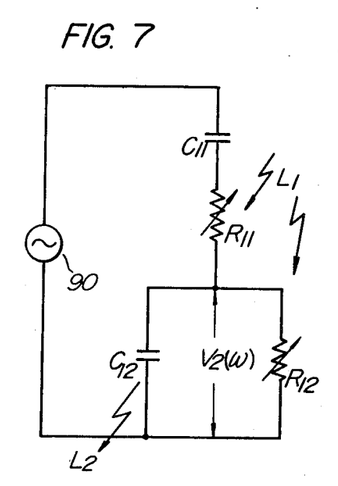
FIG. 7 is an electrical equivalent circuit diagram of the embodiment shown in FIG. 6.

In FIGS. 6 and 7 showing an approximate electrical equivalent circuit of the device shown in FIG. 6, the capacitance of the element 40 and the binder layer 60 interposed between the plate form photoconductor element 25 and the electrode 50 is represented by $C_{11}$, while the specific resistance of the plate form photoconductor element 25 which is extremely low and appears as a resistive impedance is approximately divided into resistances $R_{11}$ and $R_{12}$, $R_{11}$ being a resistance of the portion lying between the binder layer 60 and the plate form EL element 26 and $R_{12}$ being resistance of that portion connected with $R_{11}$ and filling the gaps between the spaced EL elements 26 to contact the electrode 30. The capacitance of the EL element 26 interposed between the element 25 and the electrode 30 is represented by $C_{12}$. As is commonly known, the EL elements 26 can be considered as capacitive elements normally having a high specific resistance. In the case of the EL elements formed as by vacuum deposition, such elements directly show conductivity but their specific resistance is extremely high compared with that of the element 25. In this case even if the element 26 might have a relatively low specific resistance and its impedance is no more negligible compared with $C_{22}$, the operation of the inventive device would not be impaired because it is in parallel with $R_{12}$. Thus it is a notable fact that, in the invention, not only capacitive elements but also elements of relatively high dielectric loss can be used as such EL elements.

When now an AC voltage $V(\omega)$, wherein $\omega$ is an operating angular frequency which is expressed by $\omega=2\pi f$, is applied to this RC network and the frequency $f$ is varied, voltage $V_2(\omega)$ applied across the elements 26 can be freely controlled within a range from zero to a certain finite voltage value and a frequency selection function is exhibited in which a maximum value is given at a resonance angular frequency $$\omega_0 = 2\pi f_0 = \frac{1}{\sqrt{C_1 C_2 R_1 R_2}}$$

where $f_0$ is a resonance frequency.

Figure 8:
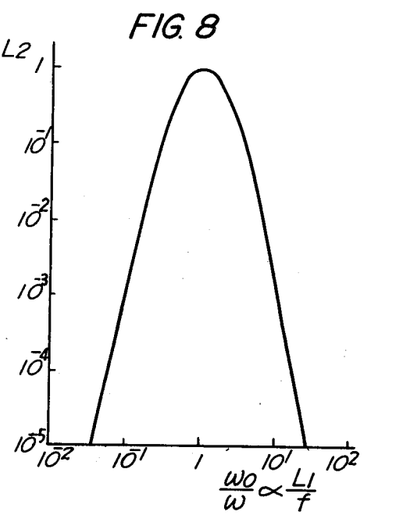
FIG. 8 is a graphic illustration of the operating characteristics of the embodiment shown in FIG. 6.

Generally, an optical output $L_2$ from the EL elements 26 varies in proportion to more than the fifth power of the amplitude of applied voltage $V_2(\omega)$. The relation between $\omega_0/\omega$ and the optical output $L_2$ (relative value) is as shown in FIG. 8. $V_2(\omega)$, hence the optical output $L_2$ becomes greatest at $\omega=\omega_0$ ($f=f_0$), that is, $\omega_0/\omega=1$, and thus a sharp single peak appears. The resistances $R_{11}$ and $R_{12}$ of the resistive photoconductor element 25 decrease when illuminated by the input infrared radiation $L_1$. Thus the abscissa $\omega_0/\omega$ is an increasing function of $L_1/f$.

When a resistive photoconductive element of low resistance as in this embodiment is used for incorporation in the prior luminous display system comprising a series connection of a photoconductor element and an EL element, excessive voltage is applied across the EL element during the dark condition and it has been impossible to make effective luminescence control by the optical input $L_1$.

In contrast thereto, in the invention, voltage applied across the EL elements 26 during the dark condition can be freely set at a small or a large value by the adjustment of the operating frequency $f$ in spite of the fact that a low-resistance element 25 is used therein. Moreover by suitably selecting the operating frequency $f$, hence the voltage $V(\omega)$ of the AC power supply 90 so that the relation $\omega_0/\omega \leq 1$ can be satisfied at the two-dimensional hi-lite portions developed by illumination with an optical input $L_1$ in the form of an infrared light image, an optical output image $L_2$ which is positive with respect to the input infrared light image $L_1$ can be derived as a luminous output from the EL elements 26. When, on the other hand, the frequency $f$ is so selected that the relation $\omega_0/\omega \geq 1$ can be satisfied in the dark condition wherein no optical input $L_1$ appears and the relation $\omega_0/\omega > 1$ can be satisfied during illumination with the optical input $L_1$, a negative optical output image $L_2$ having an inverted contrast can be obtained. Furthermore, by suitably selecting the frequency $f$ so that the relation $\omega_0/\omega < 1$ is satisfied in the dark condition wherein no optical input $L_1$ appears and the relation $\omega_0/\omega > 1$ is satisfied during illumination with the optical input $L_1$, it is possible to obtain an optical output image $L_2$ of mixed positive and negative nature.

In addition to such capability of superposition of image polarities, the device of the invention is advantageous in that a wide adjustment of the operating characteristics including adjustment of contrast, adjustment of contrast ratio of the output optical image $L_2$ and so on can be effected by adjustment of the operating frequency $f$. Conversely, an energy-sensitive resistance element 25 which may, for example, be of a known infrared light quenching photoconductor material may be used in which case the resistances $R_{11}$ and $R_{12}$ make an increase by illumination with a radiant energy input $L_1$. In this case, the relation between the image polarity and the frequency $f$ is reversed with respect to the above relation. From FIG. 8 it will be seen that the output $L_2$ varies in a remarkably non-linear fashion relative to variation of $\omega_0/\omega$. This means that a slight variation of the resistances $R_{11}$ and $R_{12}$, hence a slight variation of the radiant energy input $L_1$ causes a large non-linear variation of the output $L_2$ and thus there is an excellent advantage that a highly sensitive luminous display device can be thereby obtained.

Figure 9:
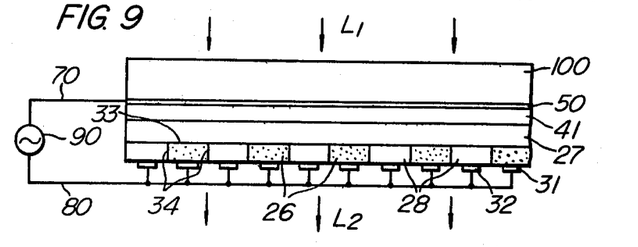
FIG. 9 is a vertical sectional view of still another embodiment of the energy-sensitive luminous display device, the device being shown together with a power supply system therefor.

In the embodiment shown in FIG. 6, the portion giving the resistance $R_{11}$ and the portion giving the resistance $R_{12}$ of the energy-sensitive resistance element are made from the same material, but these portions may be made from differential materials as shown in a modification illustrated in FIG. 9.

The modification shown in FIG. 9 is featured by the fact that an optical output from electroluminescent elements is fed back to one of variable resistance elements. In the device of FIG. 9, similar materials as used in the device of FIG. 6 are used to form EL elements 26 and a resistive infrared-sensitive photoconductive element 27. Each gap between the adjacent EL elements 26 is filled with an element whose resistance makes a decrease in response to sensing of an optical output $L_2$ fed back from the EL elements 26. This element may be a resistive CdS photoconductor of linear or strip-like form including a large amount of impurities such as chlorine and the like therein. Of course, this element may be made from a material whose specific resistance in the dark condition is extremely high. The electrode 30 in this modification consists of two kinds of electrodes 31 and 32 of narrow strip-like form, which are provided by vacuum deposition of metal such as gold on substantially central portions of the EL elements 26 and photoconductive elements 28, respectively. These electrodes 31 and 32 are connected by way of a lead 80 to a source of power supply 90. This manner of separate provision of electrodes 31 and 32 is effective for the more sharpening of the frequency selectivity. An electrode 50 is provided by depositing a metal oxide such as stannic oxide on a support plate 100 of material such as quartz which permits transmission of a radiant energy input $L_1$ which in this case is infrared light. A capacitive element 41 is formed, for example, by a thin film of binder material such as a polyester resin.

Figures 10, 12:
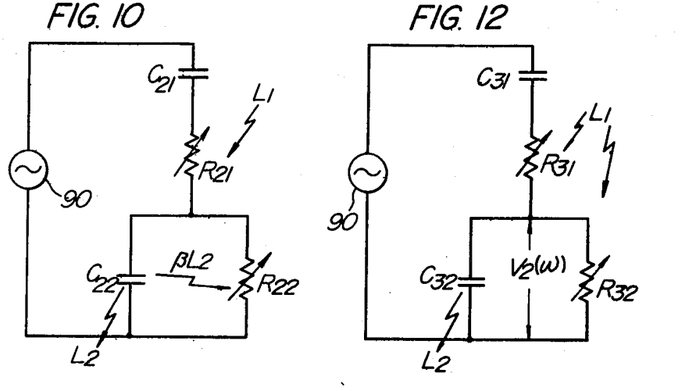
FIG. 10 is an electrical equivalent circuit diagram of the embodiment shown in FIG. 9.
FIG. 12 is an electrical equivalent circuit diagram of the embodiment shown in FIG. 11.

As will be apparent from FIG. 10 showing an electrical equivalent circuit of the device of FIG. 9, $\omega_0$ is given by $$\omega_0 = \frac{1}{\sqrt{R_{21} R_{22} C_{21} C_{22}}}$$

as in the case of the circuit of FIG. 7. The infrared light input $L_1$ causes to decrease the resistance $R_{21}$ of the photoconductor element 27, and a portion $\beta L_2$ of optical output $L_2$ from the EL elements 26 excites the adjacent photoconductive elements 28 to decrease the resistance $R_{22}$ thereof. Therefore, as apparent from reference to FIG. 8, any increase in $\omega_0$ due to $L_1$ causes an increase in $L_2$ under the operating condition satisfying the relation $\omega_0/\omega \leq 1$. This reduction of $R_{22}$ due to the action of $\beta L_2$ leads to the fact that a feedback effect of positive nature is thereby obtained which is effective to further increase $\omega_0$ and ensures a highly sensitive operation. On the other hand, under the operating condition satisfying the relation $\omega_0/\omega > 1$, the optical output fraction $\beta L_2$ shows a negative feedback effect by which the contrast, contrast ratio and the like are suitably reduced and the operating characteristics are stabilized. In the region of $\omega_0/\omega \leq 1$, a bistable condition can be obtained by suitable selection of $\beta L_2$ and the optical input $L_1$ can be stored for display. In these cases, the materials of the EL elements 26 and the photoconductive elements 28 should be properly selected so that the luminescence spectrum curve of the EL elements 26 and the photoconduction spectrum curve of the photoconductive elements 28 are suitably overlapped with each other. In the above embodiment, the portion having the resistance $R_{21}$ is solely sensitive to the optical input $L_1$, but photoconductive material of the elements 28 may be so selected that the portion having the resistance $R_{22}$ is also sensitive to the optical input $L_1$ to thereby obtain better operating characteristics.

In the two embodiments described above, the materials of the photoconductive elements 27 and 28 may be exchanged. This particular case is useful when the optical input $L_1$ is applied from that face of the device at which the electrodes 31 and 32 are disposed. Further, the materials of the photoconductive elements 27 and 28 may be so selected that they are sensitive to both the optical input $L_1$ and the feedback light $\beta L_2$ from the EL elements 26 to effect the operation at a higher sensitivity or at a higher stability. In this case, useful material for the EL elements 26 is a ZnS EL material giving an orange emission and useful material for the photoconductor elements 27 and 28 is CdS, CdSe or the like which is sensitive to visible and near infrared rays, while the optical input $L_1$ may preferably be visible or near infrared rays. Of course, the photoconductive elements 27 and 28 may be made from the same material in this particular case. In case no optical feedback from the EL elements is intended in the above embodiments, an opaque coating of resistive or capacitive material such as black paint may be applied to one face 33 and side faces 34 of each EL element 26 to prevent the portions having the resistances $R_{21}$ and $R_{22}$ from sensing the feedback light $\beta L_2$.

The above description has mainly referred to the case of employing the optical input $L_1$ as the input energy, but it will be understood that any other input energy may be used through suitable selection of other resistive energy-sensitive elements. When for example the input energy is a magnetic energy, a magnetoresistive element such as InSb may be used. Further, in lieu of the EL elements used as electrically luminescent elements in the embodiments, any other suitable elements may be used if the material thereof undergoes some kind of luminescence variation depending on the strength of the electric field applied thereto. The EL elements need not be disposed in the strip-like or linear form as described above, but may be disposed in any other form such as dots as far as they are suitably spaced from one another. Further, as shown by the electrical equivalent circuits, the resistances $R_{21}$ and $R_{22}$ and the capacitance $C_{22}$ are requested to be electrically coupled with each other. In order to ensure a satisfactory electrical coupling therebetween, it may be useful to provide a plurality of spaced and electrically insulated auxiliary electrode elements, such as vacuum deposited metal films, of dot-like, rectangular, mozaic or like shape on, for example, the side faces 34 of the energy-sensitive elements depending on the shape of the EL elements.

The present invention further provides an energy-sensitive luminous display device having a frequency selection function comprising a single or composite layer of energy-sensitive resistance material, a plurality of first electrodes arranged in the form of a grid and brought into electrical contact with one face of the energy-sensitive resistance layer, a plurality of second electrodes each disposed at a position substantially centrally of the space between the adjacent first electrodes and spaced from said face of the energy-sensitive resistance layer by a layer of electrically luminescent material having a capacitive component, a plurality of third electrodes each disposed at a position substantially centrally of the space between the adjacent first electrodes and spaced from the other face of the energy-sensitive resistance layer by a layer of capacitive dielectric material interposed therebetween, and a source of AC power supply whose frequency is adjustable or variable, said first and second electrodes being connected to one terminal of the AC power supply and said third electrodes being connected to the other terminal of the AC power supply.

One embodiment of such device will be described hereunder with regard to a case in which light rays, a photoconductive element and an electroluminescent (EL) element are used as the input energy, the energy-sensitive resistance element and the electrically luminescent element, respectively.

Figure 11:
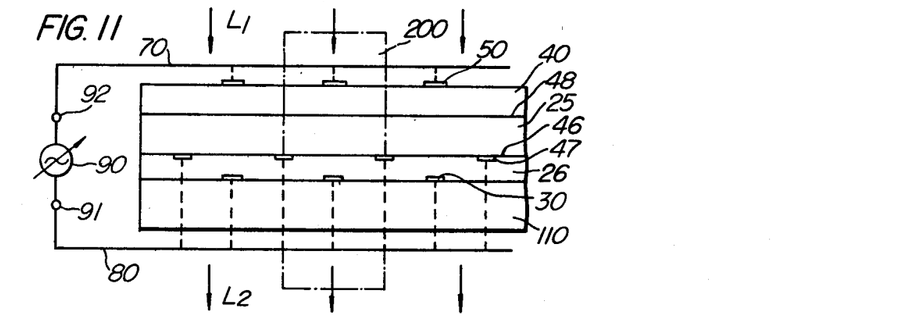
FIGS. 11 and 13 are vertical sectional views of further embodiments of the energy-sensitive luminous display device, the device being shown together with a power supply system therefor.

Referring to FIG. 11, the energy-sensitive luminous display device includes an energy-sensitive resistance element 25 made from a layer of low-resistance infrared-sensitive photoconductor such as silicon or germanium. As is commonly known, the resistance of this layer decreases when illuminated by an infrared light input $L_1$. On one face remote from the other face 48 of this layer 25, there is provided a plurality of first electrodes 47, which are arranged in the form of a grid and brought into electrical contact with the photoconductive layer 25. The first electrodes 47 are formed from strip-like films of conductive paint or vacuum deposited metal defining therebetween a plurality of spaces 46. In the present embodiment, the first electrodes 47 are arranged to form a parallel grid-like structure and are mounted on the face of the layer 25 opposite to the face 48. Reference numeral 26 designates a thin EL layer formed from a thin vacuum deposited film of material such as ZnS or made by bonding powders, for example, of ZnS by a binder such as a plastic or glass enamel. As is commonly known, this EL layer 26 exhibits a capacitive impedance of low dielectric loss. Reference numeral 30 designates grid-like second electrodes of light-transmissive material such as stannic oxide which are deposited on a support base 110 of light-transmissive material such as glass. As will be apparent from FIG. 11, the second electrodes 30 are each disposed at a position substantially centrally of the space 46 between the adjacent first electrodes 47 and spaced therefrom by the EL elements 26 interposed therebetween.

A capacitive dielectric layer 40 in the form of a sheet of material such as quartz is bonded to the face 48 of the layer 25 by a binder (not shown). Third electrodes 50 arranged in the form of a parallel grid are each disposed at a position substantially centrally of the space 46 between the adjacent first electrodes 47 and spaced therefrom by the capacitive dielectric layer 40 and the photoconductive layer 25 interposed therebetween. The third electrodes 50 are films of conductive material such as stannic oxide and are deposited on the quartz sheet 40. The elements including the layers 40 and 25 lying on the input side of the infrared light input $L_1$ are all transmissive of infrared rays. The first electrodes 47 power and the second electrodes 30 are connected by way of a lead 80 to one terminal 91 of a source of sine wave AC supply 90 whose frequency is variable, while the third electrodes 50 are connected by way of a lead 70 to the other terminal 92 of the AC power supply 90 to receive a sine wave voltage $V(\omega)$ therefrom.

FIG. 12 is an electrical equivalent circuit diagram of a portion 200 of the device in FIG. 11. In FIGS. 11 and 12, $C_{31}$, $R_{31}$, $R_{32}$ and $C_{32}$ represent a capacitance of that portion of the layer 40 between the third electrode 50 and the face 48, a resistance in the direction of thickness of that portion of the layer 25 between its face 48 and that face on which the first electrodes 47 are disposed, a half value of lateral resistance of the layer 25 lying between the adjacent first electrodes 47, and a capacitance in the direction of thickness of that portion of the EL layer 26 corresponding to the second electrode 30, respectively. An AC voltage $V_2(\omega)$ applied across the EL layer 26 shows a single peak characteristic with respect to variation of the operating frequency $f(f=\omega/2\pi)$ of the applied voltage $V(\omega)$, and a maximum value of $V_2(\omega)$ is obtained at a resonance angular frequency $$\omega_0 = 2\pi f_0 = \frac{1}{\sqrt{C_{31}C_{32}R_{31}R_{32}}}$$

Therefore, $V_2(\omega)$ can freely be controlled between zero and this maximum value with relation to variation of the frequency $f$, hence, the operating angular frequency $\omega$. It is apparent that, by illumination with the infrared ray input $L_1$, the resistances $R_{31}$ and $R_{32}$ decrease and the resonance angular frequency $\omega_0$ increases. Accordingly, in the present embodiment in which the frequency $f$ of the applied voltage $V(\omega)$ is arranged to be suitably adjusted, the frequency $f$ may be selected in a manner to satisfy the relation $\omega_0/\omega \leq 1$ or $\omega_0/\omega > 1$ at the hi-lite portion of the image resulting from illumination with the infrared ray input $L_1$. By so selecting, an optical output image $L_2$ derived from the EL layer 26 in response to the infrared ray input $L_1$ may be obtained as a positive or a negative image in spite of the use of a photoconductive material having an extremely low dark resistance. Further, to the contrast, contrast ratio and so on can be widely varied by suitable selection of the operating frequency $f$.

In the present embodiment, visible rays or near infrared rays may be used as the input $L_1$ and variation of the output $L_2$ may be fed back to the layer 25 to vary the resistances $R_{31}$ and $R_{32}$ for thereby improving the sensitivity, providing a storage effect and controlling the operating characteristics by means of feedback, if the layer 25 is made from a low dark resistance photoconductor such as CdS or CdSe which is sensitive to the EL output $L_2$. Of course, a light feedback preventive layer of material such as black paint may be disposed between the layers 25 and 26 if such feedback of optical output is undesirable.

Figure 13:
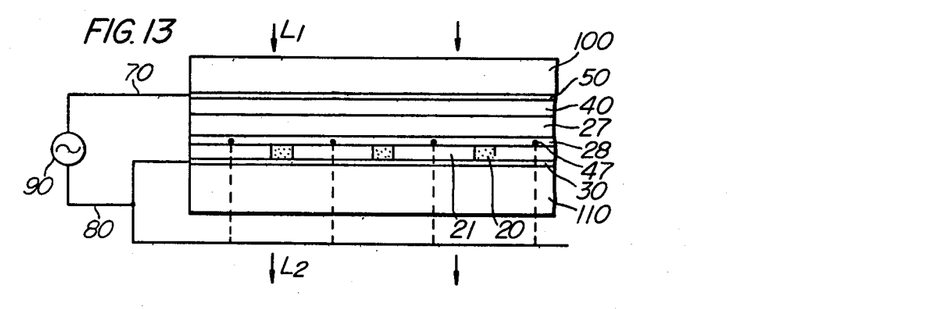

FIG. 13 shows another embodiment of the energy-sensitive luminous display device according to the invention. This embodiment includes a second electrode 30 and a third electrode 50 both of planar shape and a capacitive dielectric layer 40 of dielectric material such as a polyester resin. The third electrode 50 is deposited on a support plate 100 which is transmissive of a radiant energy input $L_1$ which in this case is an infrared ray input.

A photoconductive layer forming the resistance $R_{31}$ as shown in FIG. 12 is provided by a resistive infrared-sensitive photoconductor layer 27 of material such as (Cd-Hg)Te, while the resistance $R_{32}$ is provided by a thin photoconductive layer 28 of material such as CdS which is sensitive to an optical output $L_2$ and whose resistance is controlled by a feedback light from an EL layer 26.

The EL layers 26 are arranged in the form of strips as shown and gaps therebetween are filled with a non-luminous dielectric material such as a polyester resin. First electrodes 47 are wires of metal material such as tungsten and are embedded in the layer 28.

An equivalent circuit of that portion of the device around the EL layer 26 is substantially similar to that shown in FIG. 12. However, the resistance $R_{32}$ of the composite energy-sensitive layer 28 varies depending on the input energy which is a feedback light from the layer 26, and the resistance $R_{31}$ of the layer 27 varies depending on the input energy which is the optical input $L_1$.

The present invention further provides an energy-sensitive luminous display device comprising the combination of an energy-sensitive resistance layer exhibiting a resistive impedance of the kind in which resistance varies depending on the intensity of input energy and an electrically luminescent layer whose luminescence is variable depending on the strength of applied electric field.

Heretofore, an energy-sensitive layer such as a photoconductive layer of material having a high dark resistance has been required for the reason of impedance matching when used with an electrically luminescent layer such as electroluminescent (EL) layer for the luminescence control thereof, and it has been deemed impossible to employ the so-called infrared-sensitive photoconductor such as PbS or PbSe for cooperation with an EL layer for the control of the electroluminescence thereof because such photoconductor has a low dark resistance and exhibits a resistive impedance. According to the invention, such energy-sensitive resistance layer showing a resistive impedance is combined with an EL layer, with the former acting as a variable resistance element and the latter as a capacitance element, to form a frequency selective RC network for thereby obtaining a useful luminous display device whose luminescence varies depending on the strength of input energy.

This energy-sensitive luminous display device comprises an energy-sensitive resistance layer, a plurality of spaced first electrodes in the form of narrow strips disposed in the resistance layer, a plurality of second electrodes in the form of narrow strips disposed in staggered relation from the first electrodes and spaced therefrom by a layer of capacitive dielectric material interposed therebetween, and a plurality of third electrodes in the form of narrow strips each disposed at a position substantially centrally of the space between the adjacent first and second electrodes and spaced from the resistance layer by a layer of electrically luminescent material whose luminescence is variable depending on the strength of applied electric field.

Figure 14:
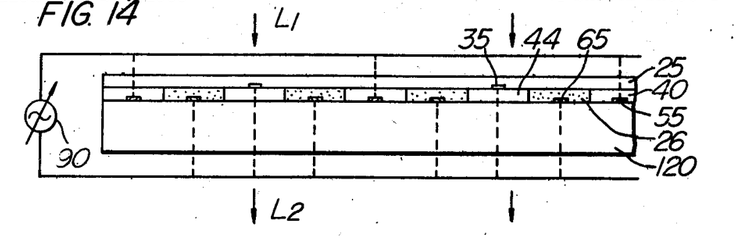
FIGS. 14 and 16 are vertical sectional views of still further embodiments of the energy-sensitive luminous display device, the device being shown together with a power supply system therefor.

Referring to FIG. 14 showing one embodiment of such device, reference numeral 25 designates an energy-sensitive resistance layer, for example, an infrared-sensitive photoconductive layer of material such as PbS, PbSe, or (Cd-Hg)Te having a low dark specific resistance. A plurality of spaced first electrodes 35 in the form of narrow metal strip are disposed in one face of the photoconductor layer 25. Reference numeral 40 designates a plurality of spaced capacitive dielectric layers of material such as $SiO_2$, in each of which a second electrode 55 in the form of narrow strip is disposed which may be a film of vacuum deposited gold, conductive paint or stannic oxide. Reference numeral 120 designates a light-transmissive support plate of material such as borosilicate glass. A plurality of spaced third electrodes 65 which may be light-transmissive conductive films of material such as stannic oxide are deposited on the support plate 120. Between the photoconductive layer 25 and each third electrode 65, there is vacuum deposited a narrow strip-like film of electroluminescent material such as ZnS. Reference numeral 44 designates spacer layers which are made from the same material as that of the layers 40. But these spacer layers 44 may be omitted, in which case the photoconductor layer 25 may extend to fill these vacant portions and the first electrodes 35 may be directly disposed on the support plate 120 or may be disposed on the opposite face of the photoconductive layer 25.

The first electrodes 35 and the third electrodes 65 are connected by way of a lead to one terminal of a source of sine wave AC power supply 90 whose frequency is variable, while the second electrodes 55 are connected by way of a lead to the other terminal of the AC power supply 90 to receive a sine wave voltage $V(\omega)$ therefrom.

Figure 15:
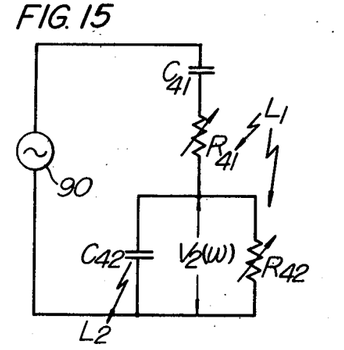
FIG. 15 is an electrical equivalent circuit diagram of the embodiment shown in FIG. 14.

FIG. 15, shows an electrical equivalent circuit of the device shown in FIG. 14. In FIG. 15, symbols $C_{41}$, $R_{41}$, $R_{42}$ and $C_{42}$ represent a capacitance in the direction of thickness of the capacitive dielectric layer 40 between the second electrode 55 and the photoconductor layer 25, a lateral resistance of that portion of the infrared-sensitive photoconductive layer 25 which corresponds to the space lying between the second electrode 55 and the third electrode 65, a lateral resistance of that portion of the infrared-sensitive photoconductor layer 25 which corresponds to the space lying between the first electrode 35 and the third electrode 65, and a capacitance in the direction of thickness of the EL layer 26 between the third electrode 65 and the photoconductive layer 25, respectively. Parallel resistance components are not shown therein since they are commonly extremely high compared with the resistance $R_{42}$. Even if such parallel resistance components exist to a considerable extent, the operation of the inventive device remains unaffected since they are in parallel relation with $R_{42}$.

It will be apparent from FIG. 15 that the voltage amplitude $V_2$ of a voltage $V_2(\omega)$ applied across the EL layer 26 shows a single peak characteristic with relation to variation of the operating frequency $f(f=\omega/2\pi)$ of the source voltage $V(\omega)$ and its maximum value $V_2=V_2\text{max}$ is obtained when $f=f_0$, that is, when the resonance angular frequency $\omega_0$ is expressed by the formula, $$\omega_0 = 2\pi f_0 = \frac{1}{\sqrt{C_{41}C_{42}R_{41}R_{42}}}$$

Thus the voltage $V_2$ is variable within a range of $$0 \leq V_2 \leq V_2\text{max}$$

by suitable adjustment of the frequency $f$. Therefore, the applied voltage ratio $V/V_2$ does not become too excessive even if the photoconductive layer 25 has an extremely low resistance in a dark state. It will be apparent that the resistances $R_{41}$ and $R_{42}$ decrease by illumination with the infrared ray input $L_1$ and thus $\omega_0$ increases as a function of $L_1$. It will also be apparent that, when the optical input $L_1$ is applied with the frequency $f$ (hence, $\omega$) suitably fixed, $f_0$ (hence, $\omega_0$) makes an increase and it is thus possible to vary the voltage $V_2$. The optical output $L_2$ from the EL layer 26 varies widely in a non-linear fashion relative to variation of voltage $V_2$. Therefore a slight variation in the resistances $R_{41}$ and $R_{42}$ with respect to the input $L_1$ can make a remarkably wide control of the output $L_2$.

When now an infrared ray image is projected as the optical input $L_1$ and the frequency $f$ is so selected that the relation $\omega_0/\omega \leq 1$ or $\omega_0/\omega > 1$ is satisfied at the hi-lite portion of the image, an EL output image $L_2$ can be derived which is either positive or negative with respect to the input $L_1$. On the other hand, an EL output image $L_2$ of mixed positive and negative nature can be obtained by selecting the frequency $f$ in a manner that the relation $\omega_0/\omega < 1$ is satisfied under the dark condition wherein no input $L_1$ appears and the relation $\omega_0/\omega > 1$ is satisfied in case of illumination with the input $L_1$. The operating characteristics including the contrast and contrast ratio can be varied widely by suitably adjusting the frequency $f$ in the manner as described above.

Referring again to FIG. 14, $R_{41}=R_{42}$ when the third electrode 65 is positioned exactly intermediate between the first electrode 35 and the adjacent second electrode 55 as shown. In this case, the single peak characteristic of $V_2$ (or optical output $L_2$) relative to $f$, that is, the frequency selection function becomes most sharpened under a condition, $C_{42}=2C_{41}$. From this, the applied voltage ratio is given by $V_2\text{max}/V_2=\frac{1}{4}$ and the angular frequency $\omega_0$ is given by $\omega_0=2\pi f_0=1/\sqrt{2C_{41}R_{41}}$. Suppose now that the lateral spacing between the third electrode 65 and the second electrode 55 is $P_1$ and the lateral spacing between the third electrode 65 and the first electrode 35 is $P_2$. Then, $P_1=P_2$ is the required condition to visualize the relation $R_{41}=R_{42}$. Suppose then that layers 40 and 26 have respective relative dielectric constants of $\epsilon_1$ and $\epsilon_2$ and respective thickness of $t_1$ and $t_2$, and the second and third electrodes 55 and 65 have respective widths of $w_1$ and $w_2$. Then the optimum condition $C_{42}=2C_{41}$ can be accomplished through suitable electrical and geometric selection of these parts so as to satisfy an equation $\epsilon_2 w_2 t_1/\epsilon_1 w_1 t_2=2$.

Suppose $\epsilon_2=8$ and $t_2=1\mu$ in the vacuum deposited ZnS EL film forming the layer 26 and $w_2=50\mu$ in the electrode 65, and $\epsilon_1=5$ and $t_1=1\mu$ in the SiO$_2$ film forming the layer 40. Then the width $w_2$ of the electrode 55 is given as $w_2=40\mu$. On the other hand, since the PbS film forming the layer 25 has a surface resistivity of about $2M\Omega/\text{cm}^2$ under the dark condition, the resonance frequency in the dark condition is given as $f_\text{od} \approx 25.5$ kc. provided that $P_1=P_2=250\mu$. Therefore the operating frequency $f$ of the AC power supply 90 in this embodiment is adjusted at a variable range of from several kilocycles to several hundred kilocycles taking the frequency $f_\text{od}$ into account. The voltage $V$ is selected at a value of 50 to 100 volts taking the dielectric strength of the layer 25 into account, and $V_2\text{max}$ is therefore about 12.5 to 25 volts which is sufficient to cause luminescence of the vacuum deposited EL layer 26.

The properties of material such as PbS are remarkably deteriorated when exposed to the atmosphere. It is desirable therefore to cover the surface of the layer 25 with a protective layer of material which is transmissive of the energy input $L_1$ or to enclose the entire device in a vacuum vessel or in a vessel filled with an inert gas.

Figure 16:
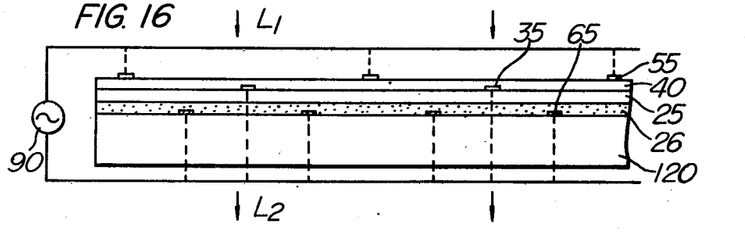

A modification of the device of FIG. 14 is illustrated in FIG. 16 in which like reference numerals are used to denote like parts appearing in FIG. 14. The device of FIG. 16 includes an EL layer 26 and a capacitive dielectric layer 40 both of continuous planar form and differs from the device of FIG. 14 in that the layer 40 and second electrodes 55 are disposed on the opposite side of third electrodes 65 with a photoconductor layer 25 interposed therebetween. This structure is advantageous in that it is very easy to make and the layer 40 prevents any deterioration of the layer 25 due to the action by the atmosphere. If the sensing of the energy-sensitive resistance layer 25 by the feedback light from the EL layer 26 is undesirable, a thin capacitive layer of black material may be interposed between the layers 25 and 26 to prevent feedback of the optical output to the layer 25.

A still further embodiment of the present invention relates to an energy-sensitive luminous display device which comprises an energy-sensitive resistance layer whose resistance is variable depending on the intensity of input energy, a plurality of first electrodes in the form of wires and a plurality of second electrodes in the form of wires disposed in alternate relation in the resistance layer, each of said second electrodes being covered with a capacitive dielectric material, a plurality of third electrodes spaced from the energy-sensitive resistance layer and each disposed at a position at least substantially centrally of the space between the adjacent first and second electrodes, and a layer of capacitive luminescent material interposed between the third electrodes and the energy-sensitive resistance layer, said capacitive luminescent material being such that its luminescence is variable depending on the strength of applied electric field.

Figure 17:
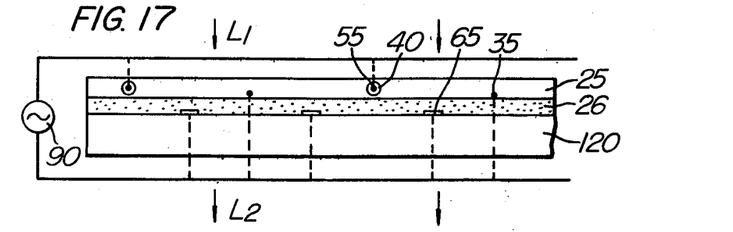
FIG. 17 is a vertical sectional view of another embodiment of the energy-sensitive luminous display device, the device being shown together with a power supply system therefor.

Referring to FIG. 17 showing the above embodiment, the energy-sensitive luminous display device includes an energy-sensitive resistance layer 25 which is, for example, an infrared-sensitive photoconductor layer made from a material such as PbS, PbSe or (Cd-Hg)Te having a low dark specific resistance or a thin resistive photoconductive layer made from a material such as CdS or CdSe having such a low dark specific resistance which has heretofore been said unfit for use in light amplifiers. Disposed in a parallel grid-like fashion in this layer 25 are a plurality of wire-like first electrodes 35 of wire-shaped conductive material such as metal filaments and a plurality of wire-like second electrodes 35 of wire-shaped conductive material such as metal filaments. Each of the latter electrodes 55 is covered with a low-loss capacitive dielectric material 40 such as a formaldehyde-type resin or glass enamel. A plurality of narrow strip-like third electrodes 65 which may be light-transmissive conductive films of material such as stannic oxide are disposed on a light-transmissive support base 120 of material such as glass. The third electrodes 65 are spaced from the photoconductor layer 25 by an electrically luminescent layer 26 interposed therebetween and each of the electrodes 65 is disposed at a position substantially centrally of the space between the adjacent first and second electrodes 35 and 55. The electrically luminescent layer 26 is made from an electroluminescent (EL) material such as ZnS. The first electrodes 35 and the third electrodes 65 are connected to one terminal of a source of sine wave AC power supply 90, while the second electrodes 55 are connected to the other terminal of the AC power supply to receive a sine wave voltage $V(\omega)$ therefrom.

Figure 18:
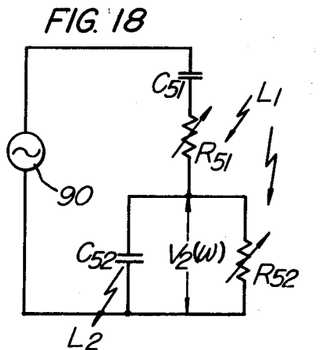
FIG. 18 is an electrical equivalent circuit diagram of the embodiment shown in FIG. 17.

FIG. 18 shows an electrical equivalent circuit of the device shown in FIG. 17. In FIG. 18, symbols $C_{51}$, $R_{51}$, $R_{52}$ and $C_{52}$ represent a capacitance of the capacitive dielectric material 40 between the second electrode 55 and the photoconductive layer 25, lateral resistances of the photoconductive layer 25 lying between the capacitive dielectric material 40 and the first electrode 35, and a capacitance of the EL layer 26 between the layer 25 and the third electrode 65 respectively.

It will be apparent from FIGS. 17 and 18 that voltage $V_2(\omega)$ applied across the EL layer 26, hence the capacitance $C_{52}$, shows a single peak characteristic with respect to the frequency $f$ of the voltage $V(\omega)$ and its maximum value $V_2$max is obtained at a resonance angular frequency $$\omega_0 = 2\pi f_0 = \frac{1}{\sqrt{C_{51}C_{52}R_{51}R_{52}}}$$

By therefore suitably selecting the value of frequency $f$, $V_2(\omega)$ can be set at any desired value within a range from zero to $V_2$max in spite of the low resistance of the layer 26. Further, the resistances $R_{51}$ and $R_{52}$ decrease when illuminated by an energy input $L_1$ which may be visible rays or infrared rays and $\omega_0$ is thereby increased. Therefore by suitably adjusting the frequency $f$ or by making it variable, $V_2(\omega)$ shows an increase, a decrease or a single peak characteristic with respect to an increase in the intensity of input energy.

An optical output $L_2$ from the EL layer 26 varies greatly in a non-linear fashion with respect to variation of the amplitude of $V_2(\omega)$. When therefore an optical image is projected as the energy input $L_1$ and the frequency $f$ is suitably selected, a positive, negative or mixed positive and negative EL output image can be obtained as desired and it is also possible by making the frequency $f$ variable to effect a wide adjustment of the operating characteristics. Further, in case the layer 25 is sensitive to the optical output $L_2$, a portion of the optical output $L_2$ may be fed back to the layer 25 having the resistances $R_{51}$ and $R_{52}$ to thereby increase the sensitivity and to effect adjustment of the operating characteristics. If this feedback of the optical output is undesirable, an opaque layer of resistive or capacitive material such as black paint may be interposed between the layers 25 and 26 to prevent the undesirable feedback.

Referring again to FIG. 17, the EL layer 26 is provided so as to uniformly and continuously underlie the first and second electrodes 35 and 55. But this is not an indispensable requirement, and those portions other than the portions covering the third electrodes 65 may be eliminated. In this case, a light-transmissive material such as a plastic or a light-reflective material such as titanium oxide may be used to fill the vacant spaces or recesses. In this case too, the third electrode 65 may be a planar electrode which extends the substantially full length between the adjacent first and second electrodes 35 and 55.

In the embodiment shown in FIG. 17, the third electrodes 65 may be metal wires in lieu of the narrow strip-like form as described. Further, the EL material may not necessarily be shaped as the layer form as shown, but may be mixed with a suitable binder such as an organic resin binder or glass enamel to be formed into a shape sufficient to cover the third electrode 65 if this electrode is in the form of a wire. In this case, the space between the wire-like third electrodes 65 covered with the EL material may be filled with a light-transmissive or light-reflective dielectric material as described hereinbefore. The second electrode 55 is preferably embedded in the energy-sensitive element layer 25 for the effective utilization of the series capacitance $C_{51}$, but the first electrode 35 may be disposed at any position in the interior or on the surface of the layer 25 provided that it is in good electrical contact with the layer 25. For the effective constitution of the frequency selective RC network of FIG. 18 in order to ensure a satisfactory electrical connection between the resistances $R_{51}$, $R_{52}$ and the capacitance $C_{52}$, a narrow strip which may be a vacuum deposited metal film or a conductive paint film may be interposed between those portions of the EL layer and the energy-sensitive resistance layer corresponding to the central portion of the space between the first and second electrodes and may be electrically insulated from these layers.

From the foregoing description, an energy-sensitive luminous display device including therein an energy-sensitive resistance layer having a low resistance can be provided by the present invention. The input energy is not limited to light rays, and magnetic energy can be used as an input by employing a magnetoresistance effect layer of material such as InSb. Thus various kinds of devices can be visualized by the suitable selection of materials. The electroluminescent material may not necessarily be a material of low-loss capacitive nature, but other material may be used if it has a suitable parallel capacitance component since, as apparent from FIG. 18, $C_{52}$ and $R_{52}$ are in a parallel relation. In the structures according to the invention, the energy-sensitive resistance layer can be formed to a very thin thickness and yet a variation in its lateral resistance is utilized. By virtue of the above fact, it forms a resistance element whose parallel capacitance component is extremely small. This leads to an advantage of good frequency selectivity and the employment of the capacitance of a dielectric material covering the second electrode gives a further advantage that the luminous display device of simple structure can be easily constructed.

What is claimed is:

1. An energy-sensitive luminous display device comprising a frequency selective RC transmission network consisting of a parallel connection of a first capacitance and a first resistance and a series connection of a second capacitance and a second resistance, said series connection being connected in series with said parallel connection, at least a portion of said first capacitance being composed of an electroluminescent element, at least one of said second capacitance and first and second resistances being composed of an energy-sensitive element whose capacitance or resistance is variable depending on the strength of applied energy, and a source of AC voltage connected to said frequency selective RC transmission network, whereby the variation of the capacitance or resistance of said energy-sensitive element due to the applied energy governs the frequency selection function of said frequency selective RC transmission network to vary the voltage across said electroluminescent element, thereby controlling the luminescence of said electroluminescent element.

2. An energy-sensitive luminous display device according to claim 1, in which at least one of said first and second resistances is composed of an energy-sensitive resistance element whose resistance is variable depending on the strength of applied energy and said second capacitance is composed of a dielectric element which is insensitive to the applied energy.

3. An energy-sensitive luminous display device according to claim 2, in which said energy-sensitive resistance element is composed of photoconductive material.

4. An energy-sensitive luminous display device according to claim 2, in which said first and second resistances are given by a photoconductive material of the same kind.

5. An energy-sensitive luminous display device according to claim 2, in which said first and second resistances are made from different kinds of photocondutive materials, respectively.

6. An energy-sensitive luminous display device according to claim 1, in which said energy-sensitive element is a resistance element comprising at least one layer, a plurality of first electrodes disposed on one face of said energy-sensitive resistance element, said first electrodes being suitably parallelly spaced from each other to define therebetween an opening, a plurality of second electrodes disposed on the same side on which said first electrodes are disposed, said second electrodes being each disposed at a position at least substantially centrally of the opening between the adjacent first electrodes and spaced from said first electrodes by a capacitive electrically luminescent element interposed therebetween, and a plurality of third electrodes disposed on the side opposite to the side on which said first electrodes are disposed, said third electrodes being each disposed at a position at least substantially centrally of the opening between the adjacent first electrodes and spaced from said energy-sensitive resistance element by a dielectric element, said first and second electrodes being connected to one terminal of a source of AC power supply and said third electrodes being connected to the other terminal of said AC power supply.

7. An energy-sensitive luminous display device according to claim 6, in which both said second electrodes and said third electrodes are parallelly spaced electrodes.

8. An energy-sensitive luminous display device according to claim 1, in which said energy-sensitive element is a resistance element, plurality of spaced first electrodes in the form of narrow strips disposed in said resistance element, a plurality of second electrodes in the form of narrow strips disposed in staggered relation from said first electrodes and spaced from said first electrodes by a layer of capacitive dielectric material, and a plurality of third electrodes in the form of narrow strips each disposed at a position substantially centrally of the space between the adjacent first and second electrodes and spaced from said energy-sensitive resistance element by a layer of electrically luminescent material whose luminescence is variable depending on the strength of applied electric field.

9. An energy-sensitive luminous display device according to claim 1, in which said energy-sensitive element is a resistance element whose resistance is variable depending on the strength of applied energy, a plurality of first electrodes in the form of wires and a plurality of second electrodes in the form of wires disposed in alternate relation in said energy-sensitive resistance element, each of said second electrode being covered with a capacitive dielectric material, a plurality of third electrodes spaced from said energy-sensitive resistance element and each disposed at a position at least substantially centrally of the space between the adjacent first and second electrodes, and a layer of capacitive electrically luminescent material interposed between said third electrodes and said energy-sensitive resistance element, said capacitive electrically luminescent material being such that its luminescence is variable depending on the strength of applied electric field.

References Cited

UNITED STATES PATENTS

| | | | |
|---|---|---|---|
| 3,029,346 | 4/1962 | Uchida et al. | 250—213 |
| 3,169,192 | 2/1965 | Kohashi | 250—213 |
| 3,210,549 | 10/1965 | Van Santen et al. | 250—213 |
| 3,217,168 | 11/1965 | Kohashi | 250—213 |
| 3,293,441 | 12/1966 | Kazan et al. | 250—213 |
| 3,300,645 | 1/1967 | Winslow | 250—213 |
| 3,244,891 | 4/1966 | Orthuber | 250—213 |

RALPH G. NILSON, Primary Examiner

C. M. LEEDOM, Assistant Examiner

U.S. Cl. X.R.

313—108